United States Patent
Ato (10) Patent No.: US 6,935,766 B2
(45) Date of Patent: Aug. 30, 2005

(54) BACKLIGHT UNIT FOR A LIQUID CRYSTAL DISPLAY INCLUDING A REFLECTION MEMBER RECEIVING CHASSIS

(75) Inventor: Noriaki Ato, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 10/662,303

(22) Filed: Sep. 16, 2003

(65) Prior Publication Data

US 2004/0062029 A1 Apr. 1, 2004

(30) Foreign Application Priority Data

Sep. 17, 2002 (JP) ........................................ 2002-270390

(51) Int. Cl.[7] ................................................. F21V 8/00
(52) U.S. Cl. ....................... 362/633; 362/609; 362/634; 349/58; 349/67
(58) Field of Search .......................... 362/31, 560, 511, 362/329, 23, 26, 29, 551, 559–561, 509, 217, 223, 317, 326, 327, 328, 633, 634, 609, 600, 610, 614, 615, 632, 640, 647; 385/129, 130, 131, 147; 349/65, 56, 58, 60–63, 70, 67

(56) References Cited

U.S. PATENT DOCUMENTS

| 4,229,783 | A | * | 10/1980 | Eberhardt | 362/23 |
|---|---|---|---|---|---|
| 4,729,068 | A | * | 3/1988 | Ohe | 362/31 |
| 5,489,999 | A | * | 2/1996 | Matsumoto | 349/62 |
| 5,703,667 | A | * | 12/1997 | Ochiai | 349/65 |
| 5,951,138 | A | * | 9/1999 | Ishikawa | 362/31 |
| 6,123,430 | A | | 9/2000 | Ono et al. | |
| 6,139,162 | A | * | 10/2000 | Masaki | 362/31 |

* cited by examiner

*Primary Examiner*—Thomas M. Sember
*Assistant Examiner*—Ismael Negron
(74) *Attorney, Agent, or Firm*—Young & Thompson

(57) ABSTRACT

A backlight unit for use in an LCD unit includes an optical guide plate, a tubular lamp extending along the lateral side of the optical guide plate, a reflection member including a reflector encircling the tubular lamp at three sides thereof and a reflection sheet disposed at the rear side of the optical guide plate, a chassis receiving therein the optical guide plate and the reflection member, and a lamp holder disposed at the corner portion of the chassis. The reflector has an extension at the corner portion, the extension being sandwiched between the chassis and the lamp holder to restrict the lateral movement of the reflector.

11 Claims, 6 Drawing Sheets

BACKLIGHT UNIT FOR A LIQUID CRYSTAL DISPLAY INCLUDING A REFLECTION MEMBER RECEIVING CHASSIS

BACKGROUND OF THE INVENTION (a) Field of the Invention

The present invention relates to a backlight unit for use in a liquid crystal display (LCD) unit and, more particularly, to a backlight unit having a reflector formed integrally with a reflection sheet for an optical guide plate.

(b) Description of the Related Art

Figure 8:
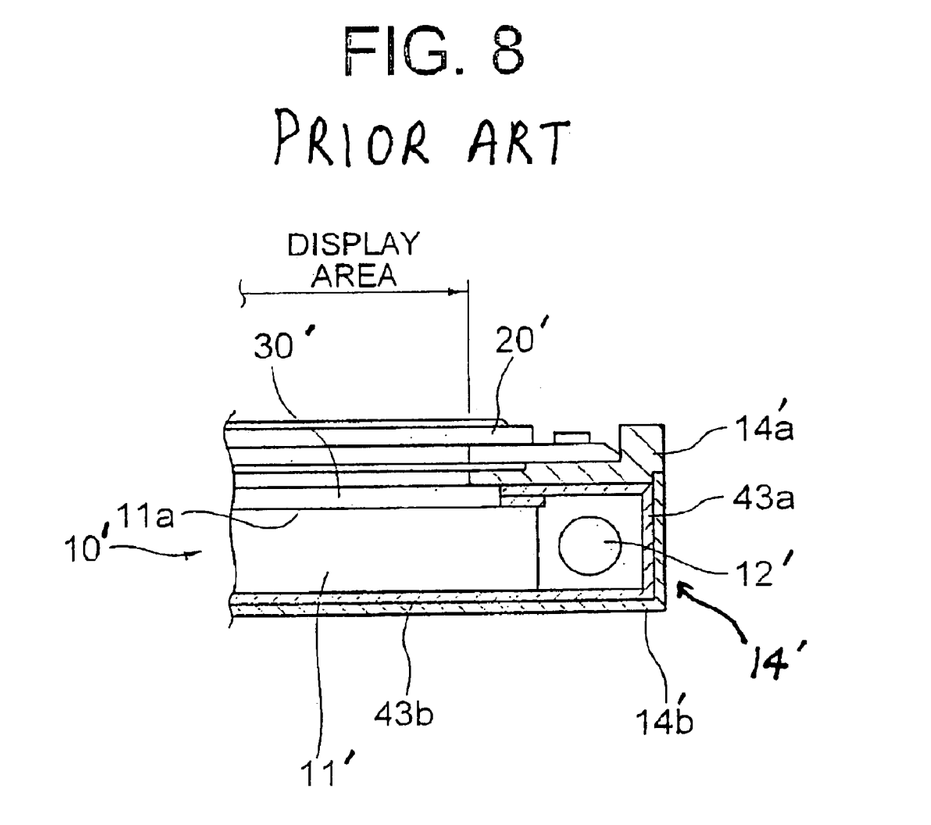
FIG. 8 is a partial sectional view of a conventional LCD unit.

LCD units are widely used in the field of televisions and cellular phones in addition to the fields of peripheral devices for computers. FIG. 8 shows an LCD unit having a conventional backlight unit, such as described in Patent Publication JP-A-2002-40413.

The conventional LCD unit includes an LCD panel 20' wherein a liquid crystal layer is sandwiched between a pair of glass substrates, a backlight unit 10' for generating light for the LCD panel 20', an optical sheet 30' disposed between the backlight unit 10' and the LCD panel 20' for providing the light from the backlight unit 10' to the LCD panel 20', and a housing (not shown) for receiving therein these members as a whole.

The backlight unit 10' includes a rectangular optical guide plate 11' having a front irradiation surface 11a, a tubular lamp 12' extending along three edges of the rectangular optical guide plate 11', a reflection member 43 for guiding the light from the lamp 12' toward the irradiation surface 11a of the optical guide plate 11', and backlight chassis 14' for receiving therein the reflection member 43 and the optical guide plate 11' for support thereof in unison. The reflection member 43 includes a reflection sheet 43b adhered onto the rear surface of the optical guide plate 11', and a reflector 43a for encircling the lamp 12' at three sides of the lamp 12' including the front side, the rear side and one of the lateral sides far from the optical guide plate 11'. The reflection member 43 is of an integral type wherein the reflection sheet 43b and the reflector 43a are integrally formed.

Figure 9A:
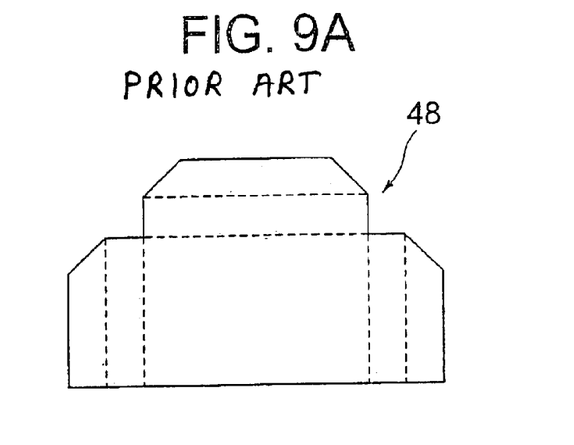
FIG. 9A is a top plan view of the sheet material for fabricating the reflection member.
Figure 9B:
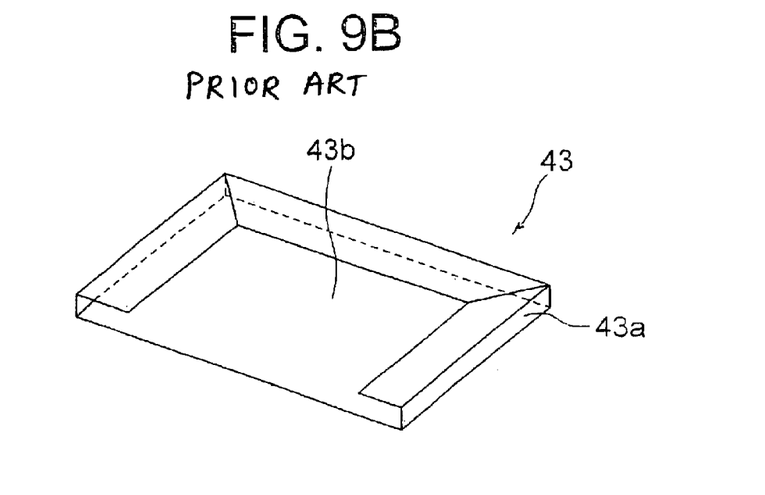
FIG. 9B is a perspective view of the reflection member obtained from the sheet material shown in FIG. 9A.

The reflection member 43 of the integral type as described above is made of a sheet material, for example, obtained by covering polyethylene terephthalate (PET) with a reflection coat. FIGS. 9A and 9B show the shape of the sheet material and the final shape of the reflection member 43, respectively. A sheet material 48 having a thickness of 200 μm and shown in FIG. 9A is prepared, and folded along the pleat lines (shown by dotted lines) formed beforehand, to thereby obtain the final structure of the reflection member 43 including a reflection sheet 43b and a reflector, which are integrally formed. The pleat lines are formed on the sheet material 48 so that no cut portion of the pleat lines resides on the outer edge of the reflection member 43.

Back to FIG. 8, the backlight chassis 14' includes a chassis body 14'a disposed between the LCD panel 20' and the optical guide plate 11' as well as between the LCD panel 20' and the reflection member 43, and a chassis case 14'b for receiving therein the optical guide plate 11' and the reflection member 43 in unison. The outer edge of the display area of the LCD panel 20' resides in the very vicinity of and at the inner side of the inner edge of the chassis body 14'a. The reflector 43a of the reflection member 43 is positioned with respect to the optical guide plate 11' by adhering the front edge of the reflector 43a onto the irradiation surface 11a of the optical guide plate 11' via a adhesive tape.

The conventional backlight unit as described above has a problem in that the temperature change generated by the ON/OFF of the backlight source causes a lateral movement of the front side of the reflector 43a with respect to the optical guide plate 11'. The relative movement results from the reduction in the adhesive force of the adhesive tape due to the temperature rise, a difference in the heat capacity between the adhesive tape and the optical guide plate 11', and the thermal expansion of the optical guide plate 11'.

More specifically, after the lamp 12' is turned ON to raise the ambient temperature, for example, the adhesive tape first reduces in its adhesive force, and then the optical guide plate 11' expands to shift the edge thereof toward the outer edge of the backlight chassis 14'. At this stage, the front side of the reflector 43a maintains its original position because the lateral side of the reflector 43a is supported by the chassis case 14b of the backlight chassis 14'. Thus, the edge of the optical guide plate 11' moves toward the outer edge of the backlight chassis 14' with respect to the front edge of the reflector 43a.

After the ambient temperature falls, the adhesive tape recovers its original adhesive force, and then the optical guide plate 11' contracts to recover the original state. This causes the front edge of the reflector 43a to be pulled by the edge of the optical guide plate 11' via the adhesive tape, whereby the front edge of the lateral side of the reflector 43a departs from the chassis case 14b of the backlight chassis 14' toward the central area of the LCD panel 20'.

Iterative cycle of the temperature rise and temperature fall causes a nonreversible gradual movement of the front edge of the reflector 43a toward the central area of the LCD panel, and the front edge eventually appears in the display area of the LCD panel 20' to raise a defect on the screen.

Figure 10:
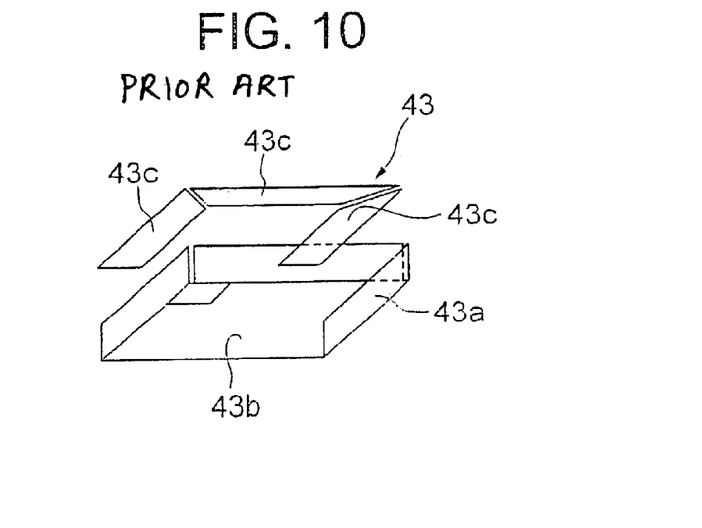
FIG. 10 is a perspective view of the reflection member of the backlight unit described in a patent publication.

For solving the above problem in the conventional backlight unit, the invention described in the publication uses a sheet material having separate front portions such as shown in FIG. 10. More specifically, the reflector 43a of the reflection member 43 has separate sheets 43c for the front side, formed separately from the reflector 43a and the reflection sheet 43b which are integrally formed. This configuration allows the front side of the reflector 43a and the optical guide plate 11' to move in unison, upon the expansion and contraction of the optical guide plate 11', thereby preventing the above defect.

In the conventional backlight unit described in the publication, although it is possible to prevent the above defect in the LCD unit, there arise other disadvantages as described hereinafter.

First, the separate sheets for the front side of the reflector impair the advantages of the refection member of the integral type, whereby the number of parts of the reflection member increases to increase the number of parts of the LCD unit and thus man-hours for fabricating the LCD unit.

Second, the separation of the front side from the lateral side in the reflector causes ingress of dust etc. through the gap therebetween, and increases the leakage of light to reduce the illumination efficiency of the backlight unit.

SUMMARY OF THE INVENTION

In view of the above problems in the conventional backlight unit, it is an object of the present invention to provide an improved backlight unit including a reflection member of an integral type and capable of preventing the defect in the display area caused by the relative movement of the reflector.

It is another object of the present invention to provide an LCD unit including such a backlight unit.

The present invention provides, in a first aspect thereof, an backlight unit including: an optical guide plate having a front irradiation surface; a tubular lamp extending along a lateral side of the optical guide plate; a reflection member including a reflector for encircling the tubular lamp except for the lateral side of the optical guide plate and a reflection sheet disposed at a rear side of the optical guide plate; a chassis for receiving therein the reflection member and the optical guide plate for support of the reflection member and the optical guide plate; and a lamp holder for supporting the tubular lamp at a corner portion of the chassis, wherein the reflector has a first portion sandwiched between the chassis and the lamp holder, the first portion restricting a lateral movement of at least a front edge of the reflector with respect to the chassis.

The present invention also provides, in a second aspect thereof, a backlight unit including: an optical guide plate having a front irradiation surface; a tubular lamp extending along a lateral side of the optical guide plate; a reflection member including a reflector for encircling the tubular lamp except for the lateral side of the optical guide plate and a reflection sheet disposed at a rear side of the optical guide plate; a chassis for receiving therein the reflection member and the optical guide plate for support of the reflection member and the optical guide plate; and a lamp holder for supporting the tubular lamp at a corner portion of the chassis, wherein the reflector has an engagement at a front side thereof, the engagement engaging with the chassis to restrict a lateral movement of at least a front edge of the reflector with respect to the chassis.

In accordance with the backlight units of the present invention, since the lateral movement of the front edge of the reflector toward the central area of a LCD panel with respect to the chassis, the defect wherein the front edge of the reflector appears in the display area can be prevented.

The above and other objects, features and advantages of the present invention will be more apparent from the following description, referring to the accompanying drawings.

PREFERRED EMBODIMENTS OF THE INVENTION

Now, the present invention is more specifically described with reference to accompanying drawings, wherein similar constituent elements are designated by similar reference numerals throughout the drawings.

Figure 1:
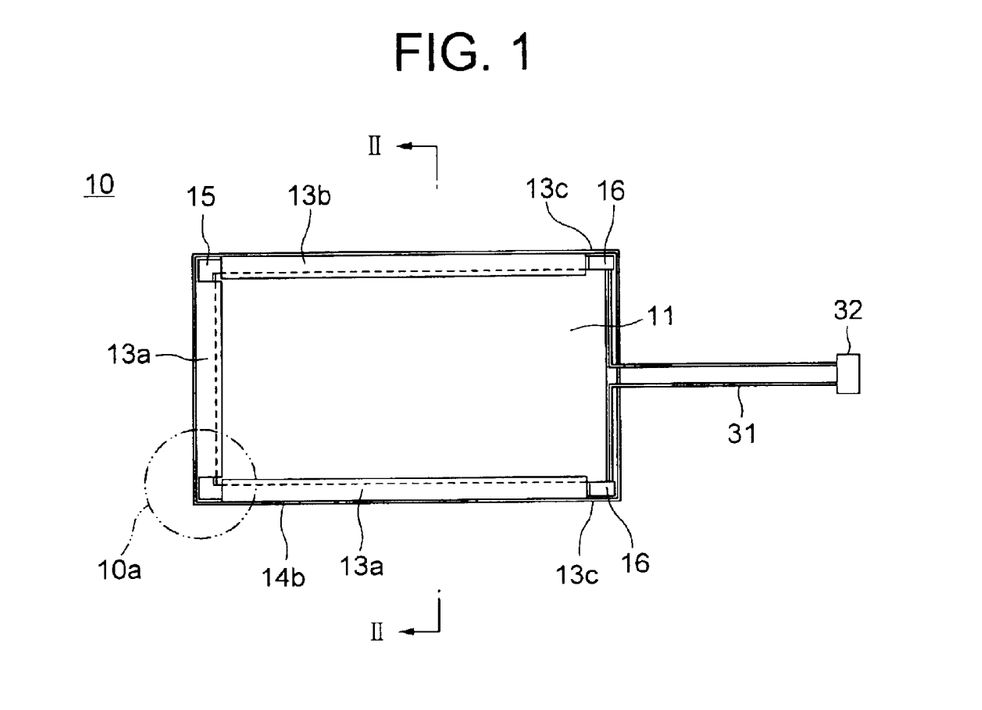
FIG. 1 is a front view of a backlight unit according to a first embodiment of the present invention.
Figure 2:
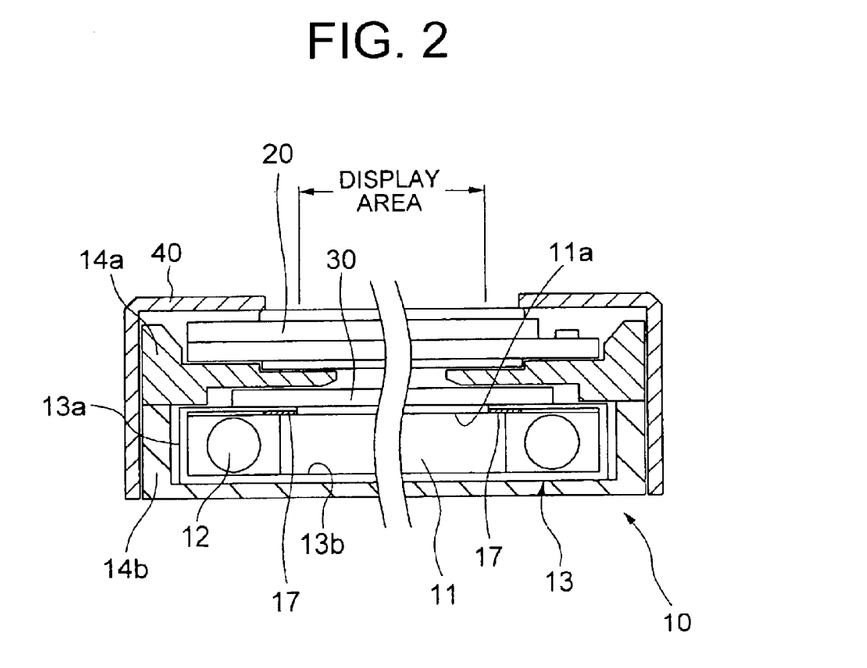
FIG. 2 is a sectional view of an LCD unit including the backlight unit of FIG. 1, taken along a line corresponding to line II—II in FIG. 1.

Referring to FIG. 1, there is shown a backlight unit according to a first embodiment of the present invention, with the chassis body of the backlight chassis being omitted for depiction. FIG. 2 shows an LCD unit including the backlight unit of FIG. 1.

The backlight unit, generally designated by numeral 10 in FIG. 1, includes a rectangular optical guide plate 11 having a front irradiation surface 11a, a cold-cathode tube 12 extending along the three edges of the rectangular optical guide plate 11, a reflection member 13 including a reflector 13a and a reflection sheet 13b integrally formed, an optical sheet 30 disposed between the optical guide plate 11 and the LCD panel 20 for introducing the parallel ray from the irradiation surface 11a of the optical guide plate 11 to the LCD panel 20, and a backlight chassis 14 for receiving therein the reflection member 13 and the optical guide plate 11 for support thereof in unison. The reflector 13a encircles the cold-cathode tube at three sides thereof including the front side, rear side and one of the lateral sides far from the optical guide plate 11. The reflection sheet 13 is disposed on the rear surface of the optical guide plate 11 and formed integrally with the reflector 13a.

Each end of the cold-cathode tube 12 is supported by the backlight chassis 14 via a support member, or lamp holder, 16 of a rectangular prism having therein a through hole. The cold-cathode tube 12 is also supported at the corners of the backlight unit 10 by the backlight chassis 14 via a lamp holder 15 made of rubber having an "L" shape with a horseshoe cross section. The optical sheet 30 has a laminated structure including dispersion film, lens film, polarization film etc. The power source wires 31 for the cold-cathode tube 12 are connected to power source lines formed on a printed circuit board (not shown) via a socket 32.

The LCD unit, as shown in FIG. 2, includes the backlight unit 10, an LCD panel 20 disposed at the front side of the backlight unit 10, and a housing 40 for receiving therein the backlight unit 10, LCD panel 20 and the optical sheet 30 for support thereof in unison.

The backlight chassis 14 includes a chassis body 14a disposed between the optical sheet 30 of the backlight unit 10 and the LCD panel 20 for positioning the backlight unit 10 with respect to the LCD panel 20, and a chassis case 14b for receiving therein the optical guide plate 11 and reflection member 13. The edge of the display area of the LCD unit resides at the very vicinity of and inner side of the edge of the housing 40 adjacent to the screen. The edge of the reflector 13a near the irradiation surface 11a of the optical guide plate 11 is adhered onto the optical guide plate 11 via a double-sided adhesive tape 17.

Figure 3:
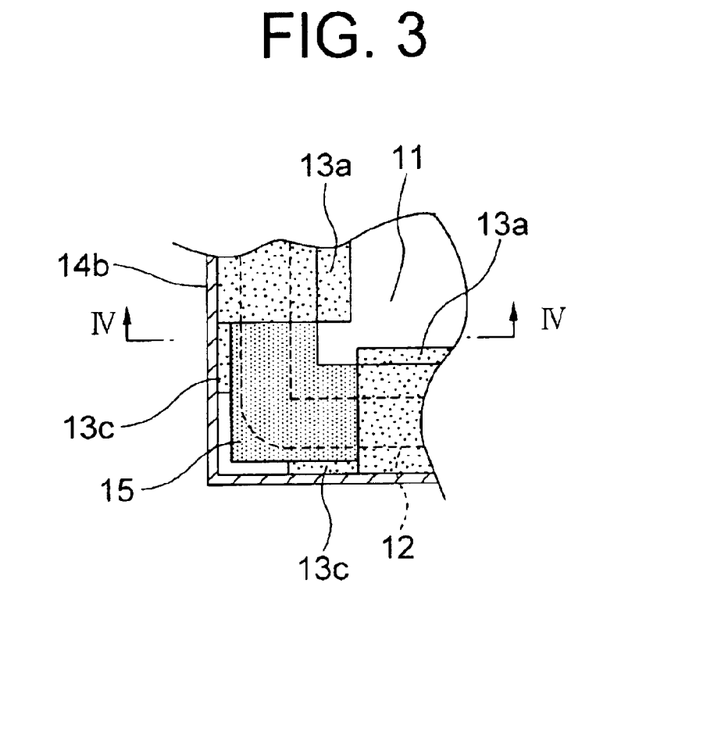
FIG. 3 is a detailed, partial sectional view of the LCD unit of FIG. 2.
Figure 4:
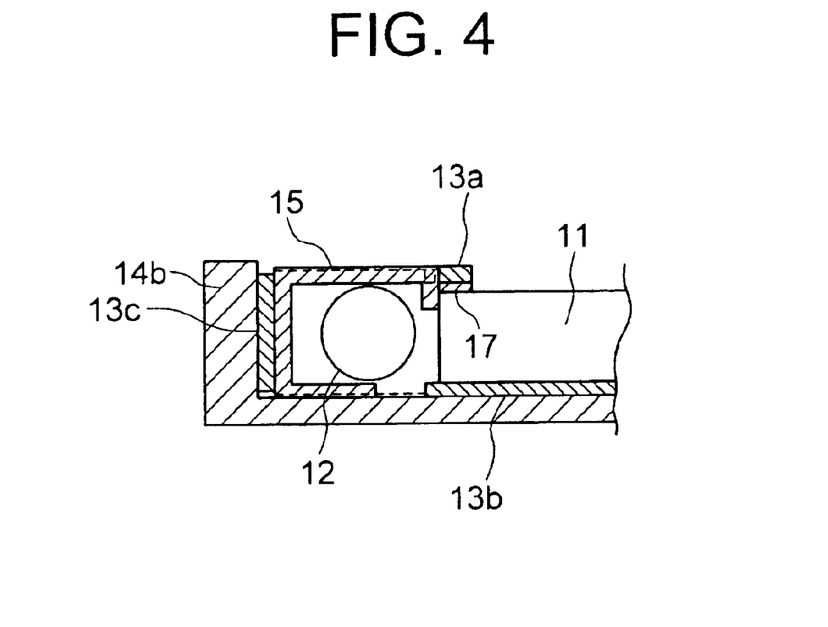
FIG. 4 is a sectional view taken along line IV—IV in FIG. 3.

FIG. 3 shows the detail of the corner portion 10a of the backlight unit 10 of FIG. 1, and FIG. 4 shows a section taken along line IV—IV in FIG. 3. In each corner portion 10a of the backlight unit 10, there is provided either a lamp holder 15 having a horseshoe cross section as viewed normal to the screen, or a lamp holder 16 of a rectangular prism shape having a through hole with a diameter substantially equal to the outer diameter of the cold-cathode tube 12. Each lamp holder 15 or 16 is of an "L" shape or rectangular prism, and is sandwiched between a portion of the chassis body 14a and a portion of the chassis case 14b both exposed from the reflector 13a which terminates in the vicinity of the corner.

An extension 13c, extending from the end of the lateral side of the reflector 13a, is sandwiched between the chassis case 14b of the backlight chassis 14 and the lateral side of each lamp holder 15 or 16. The extension 13c sandwiched between the chassis case 14b and the lamp holder 15 or 16 restricts the lateral movement of the lateral side of the reflector 13a, and thus the lateral movement of the front edge of the reflector 13a. In other words, the reflection member 13 has a cutout at the corner portion 10a on both the front side and rear side of the reflection member 13 for exposing the inner surfaces of the backlight chassis 14. Thus, the lamp holder 15 is directly supported by the portions of the backlight chassis 14 exposed by the cutout, to maintain the position of the extension 13c with respect to the lateral side of the chassis case 14b of the backlight chassis 14, thereby restricting the movement of the reflector 13a toward the central area of the LCD panel 20.

Figure 5A:
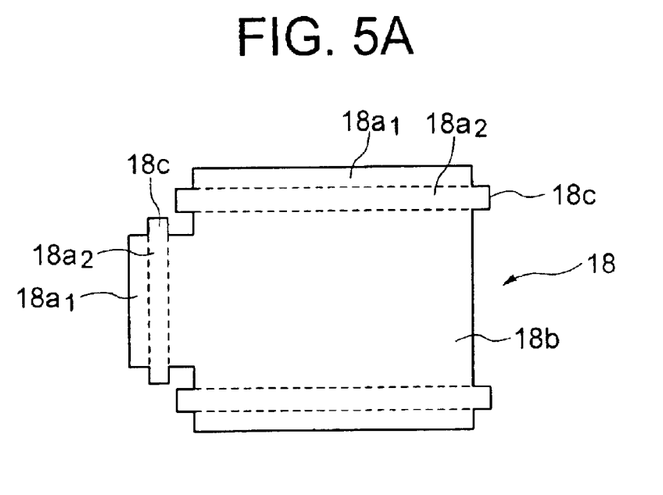
FIG. 5A is a top plan view of a sheet material used for forming the reflection member shown in FIG. 1.
Figure 5B:
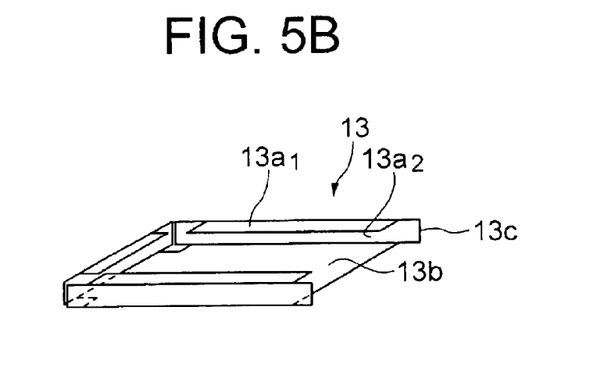
FIG. 5B is a perspective view of the reflection member obtained from the sheet material of FIG. 5A.

Referring to FIGS. 5A and 5B, there are respectively shown a sheet material 18 used for forming the reflection member 13 including the reflector 13a and reflection sheet 13b, and the final structure of the reflection member 13 after folding the sheet material 18. The dotted lines shown in FIG. 5A are pleat lines of the sheet material 18 for folding the sheet material 18 thereat. The sheet material 18 is obtained by covering PET with a reflection coat, for example. The sheet material 18 includes outer edge portions 18a1 and 18a2 which constitute the front side 13a1 and lateral side 13a2, respectively, of the reflector 13 after folding, a central portion 18b which constitutes the reflection sheet 13b after folding, and extended portions 18c which constitute extensions 13c extending from the lateral sides of the reflector 13a.

As described above, in the backlight unit 10 of the present embodiment, the lamp holder 15 inhibits the nonreversible lateral movement of the front edge of the reflector 13a to prevent the edge of the reflector 13a from appearing in the display area.

In an alternative of the above configuration, the reflector need not have a cutout in the corner portion. In such a case, the lamp holder 15 or 16 should have a cross section adapted to the cross section of the reflector 13a to prevent the deformation of the reflector 13a, thereby restricting the lateral movement of the reflector toward the central area.

Figure 6:
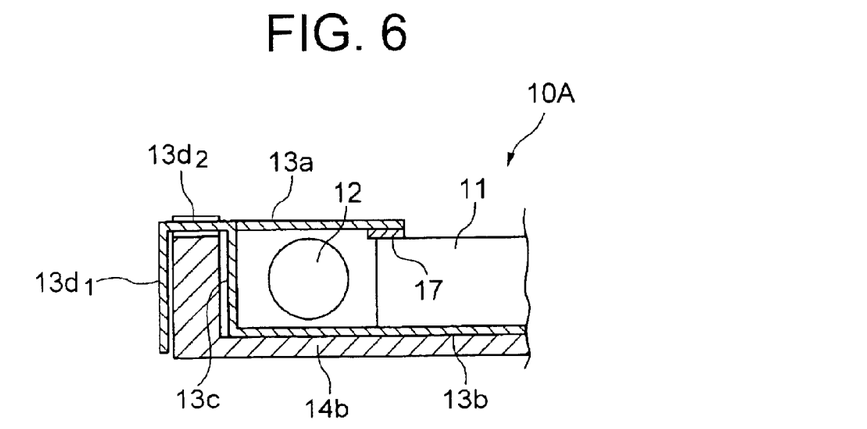
FIG. 6 is a partial sectional view of a backlight unit according to a second embodiment of the present invention.

Referring to FIG. 6, there is shown the corner portion of a backlight unit 10A according to a second embodiment of the present invention similarly to the backlight unit of the first embodiment. The backlight unit 10A of the present embodiment is similar to the first embodiment except that the extension 13c of the reflector 13a in the present embodiment is provided with engagement members 13d (13d1 and 13d2) which engages with the lateral side of the chassis case 14b of the backlight chassis 14. The engagement member restricts the lateral movement of the front edge of the reflector 13a toward the central area of the LCD panel. It is to be noted that the engagement member 13d may extend from the front side of the reflector 13a instead of the extension 13c.

Figure 7A:
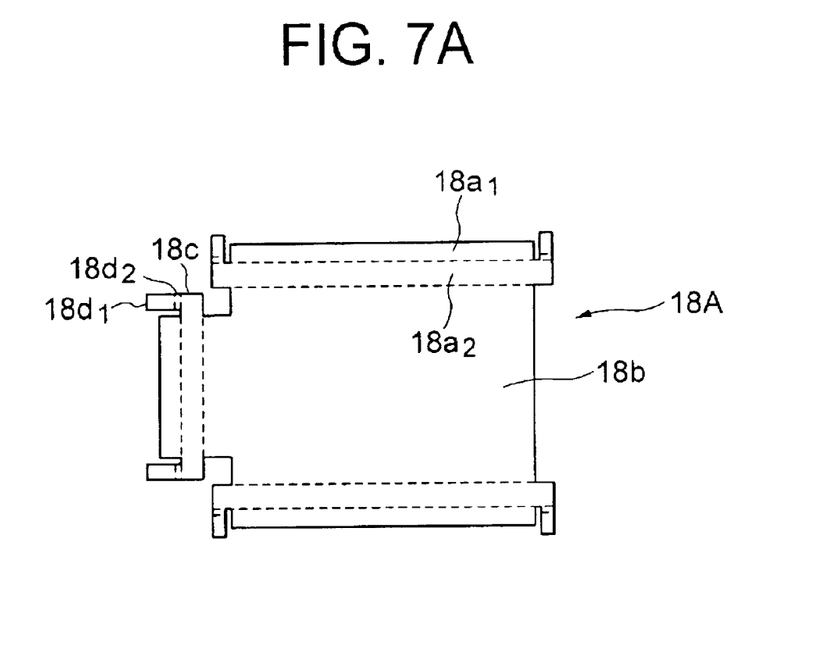
FIG. 7A is a top plan view of the sheet material for fabricating the reflection member shown in FIG. 6.
Figure 7B:
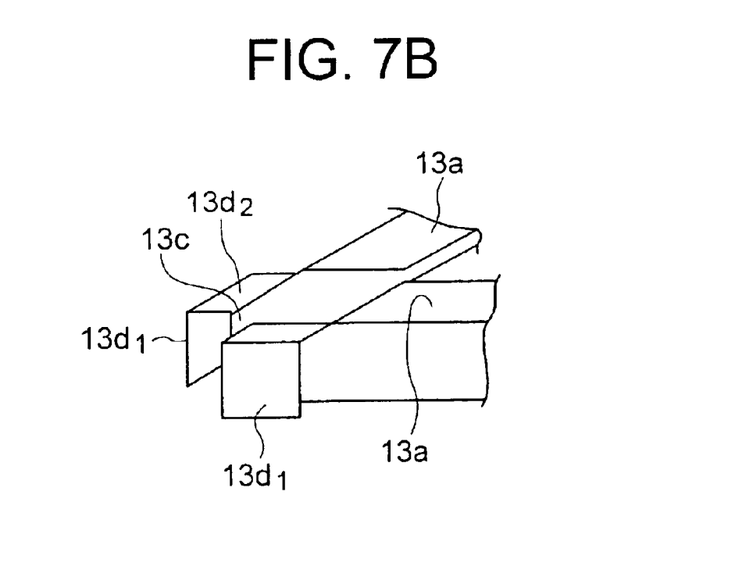
FIG. 7B is a partial perspective view of the reflection member obtained from the sheet material of FIG. 7A.

FIG. 7A shows the sheet material 18A for forming the reflection member 13 in the backlight unit of the second embodiment, and FIG. 7B shows a partial perspective view after folding the sheet material 18A. The sheet material 18A of FIG. 7A has additional extensions 18d1 and 18d2 extending from the extension 18c, the additional extensions 18d1 and 18d2 constituting the engagement member 13d1 and 13d2 shown in FIG. 7B after folding the sheet material 18A.

In the second embodiment, the lateral movement of the reflector 13a toward the central area is restricted by the lateral side of the chassis case 14b of the backlight chassis 14 in addition to the lamp holder 15 or 16, whereby the lateral movement of the front side of the reflector can be more effectively restricted. In the present embodiment, the lamp holder may be omitted in the corner portion so long as it is used for the purpose of restricting the lateral movement of the front edge of the reflector. The term "lateral movement" as used herein means a movement other than backward and forward movements, and thus includes an upward or downward movement. The term "horseshoe" shape as use herein means a substantially rectangular shape, with an edge removed from the substantially rectangular shape, irrespective of whether the corners thereof are edged or round.

It is to be noted that the reflector used in the present invention need not have a cutout for exposing the inner surfaces of the backlight chassis. In such a chassis case, the lamp holder should have a cross section adapted for the cross section of the reflector, should be in direct contact with the reflector. This prevents a deformation of the reflector and thus restricts the lateral movement of the front edge of the reflector.

Since the above embodiments are described only for examples, the present invention is not limited to the above embodiments and various modifications or alterations can be easily made therefrom by those skilled in the art without departing from the scope of the present invention.

What is claimed is:

1. A backlight unit comprising:
   an optical guide plate having a front irradiation surface;
   a tubular lamp extending along a lateral side of said optical guide plate;
   a reflection member including a reflector for encircling said tubular lamp except for said lateral side of said optical guide plate and a reflection sheet disposed at a rear side of said optical guide plate;
   a chassis for receiving therein said reflection member and said optical guide plate for support of said reflection member and said optical guide plate in unison; and
   a lamp holder for supporting said tubular lamp at a corner portion of said chassis, wherein:
   said reflector has a first portion sandwiched between said chassis and said lamp holder, said first portion restricting a lateral movement of at least a front edge of said reflector with respect to said chassis.

2. The backlight unit according to claim 1, wherein said front edge of said reflector and said optical guide plate are adhered together by an adhesive tape.

3. An LCD unit comprising said backlight unit according to claim 1, and an LCD panel receiving light from said irradiating surface.

4. The backlight unit according to claim 1, wherein said engagement engages with a lateral side of said chassis.

5. The backlight unit according to claim 1, wherein said reflector is separated at a corner portion of said chassis, and said first portion extends from an end of said reflector at said corner portion.

6. The backlight unit according to claim 5, wherein said first portion has an engagement which engages with a lateral side of said chassis.

7. The backlight unit according to claim 1, wherein said lamp holder has a horseshoe cross section as viewed normal to an extending direction of said tubular lamp, said horseshoe cross section having an opening at said lateral side of said optical guide plate.

8. The backlight unit according to claim 7, wherein said horseshoe cross section is adapted to a cross section of said reflector.

9. The backlight unit according to claim 7, wherein said reflector has a cutout for exposing a portion of said chassis, whereby said lamp holder is supported by said chassis at said exposed portion thereof.

10. A backlight unit comprising:
   an optical guide plate having a front irradiation surface;
   a tubular lamp extending along a lateral side of said optical guide plate;
   a reflection member including a reflector for encircling said tubular lamp except for said lateral side of said optical guide plate and a reflection sheet disposed at a rear side of said optical guide plate;
   a chassis for receiving therein said reflection member and said optical guide plate for support of said reflection member and said optical guide plate in unison; and
   a lamp holder for supporting said tubular lamp at a corner portion of said chassis, wherein:
   said reflector has an engagement at a front side thereof, said engagement engaging with said chassis to restrict a lateral movement of at least a front edge of said reflector with respect to said chassis.

11. An LCD unit comprising said backlight unit according to claim 10, and an LCD panel receiving light from said irradiating surface.

* * * * *